Aug. 9, 1966 N. LANE 3,265,395

AUTOMATIC RECORD CHANGING APPARATUS

Filed Sept. 12, 1963

4 Sheets-Sheet 1

Aug. 9, 1966

N. LANE 3,265,395

AUTOMATIC RECORD CHANGING APPARATUS

Filed Sept. 12, 1963

4 Sheets-Sheet 2

Aug. 9, 1966 N. LANE 3,265,395

AUTOMATIC RECORD CHANGING APPARATUS

Filed Sept. 12, 1963

4 Sheets-Sheet 3

United States Patent Office 3,265,395

Patented August 9, 1966

3,265,395

AUTOMATIC RECORD CHANGING APPARATUS

Norman Lane, Halesowen, England, assignor to BSR Limited, Old Hill, England, a British company Filed Sept. 12, 1963, Ser. No. 308,586
Claims priority, application Great Britain, Sept. 12, 1962, 34,769/62
6 Claims. (Cl. 274—15)

The present invention relates to automatic record changing apparatus of the type in which records of various diameters are dropped in succession on to the turntable of a record player from a stack held on a vertical spindle extending upwardly from the turntable and in which the pick-up arm is moved in towards the center of the turntable, arrested above the edge of the record and the stylus lowered into the run-in groove of the record, automatic means determining the position at which the pick-up arm should be arrested according to the size of the record last dropped onto the turntable.

The invention is concerned with apparatus of the type in which the said automatic means operates by engagement or non-engagement of the record as it moves down the vertical spindle with a selector lever projecting from a post on the base of the apparatus, the record depressing the selector lever to an extent determined by the diameter of the record and the extent of depression of the lever determining the position of a vertical lever which arrests the pick-up arm in its motion towards the center of the table by engaging one or other of a number of abutments on a horizontal quadrant plate, which rotates with the pick-up arm, according to the position of the said vertical lever. Hereinafter, such apparatus is referred to as being "apparatus of the type specified."

The object of the present invention is to provide an improved automatic means for determining the position at which the pick-up arm should be arrested in its return towards the center of the turntable prior to being lowered into the run-in groove of the record, which requires less clearance between the lowest record of the stack held on the vertical spindle and the uppermost record on the turntable.

According to the present invention I provide an apparatus of the above mentioned type in which the selector lever which projects into the path of the record is held in a lowered position while the apparatus is at rest and is released to move into its normal operative position before the lowest record of the stack on the vertical spindle is dropped on to the turntable.

In the hitherto known apparatus of the type specified, a number of abutments are provided on the mounting of the selector lever for engagement by the vertical lever according to the extent to which the selector lever is depressed.

Preferably the above mentioned lowering of the selector lever is achieved by including upon the mounting of the selector lever an inclined ramp engaging with the upper end of the vertical lever, the said ramp being horizontally displaced from the abutments on the selector lever mounting against which the vertical lever is biased by a spring, so that the vertical lever only engages the ramp and lowers the selector lever when it is moved against the spring bias on to its rest position by the other parts of the mechanism according to the normal cycle of operation of the apparatus.

One embodiment of the invention is illustrated in the accompanying drawings wherein.

Figure 3:
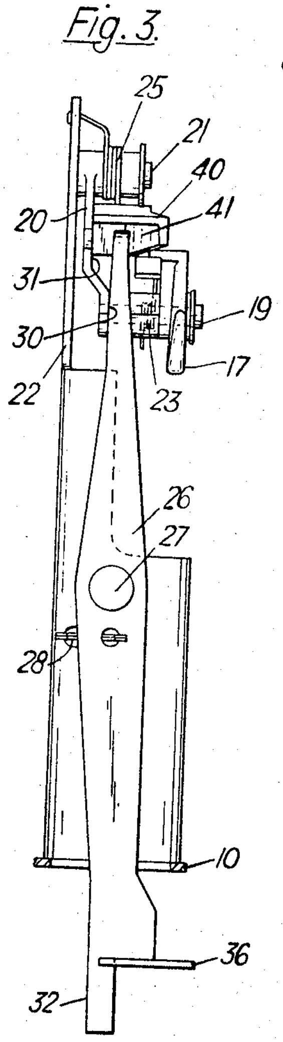
FIGURE 3 is an end view of the selector lever assembly looking radially outwards from the center spindle of the record player.

FIGURES, 5, 6 and 7 are views corresponding to FIGURE 3 but showing the selector lever in its various positions.

Figure 1:
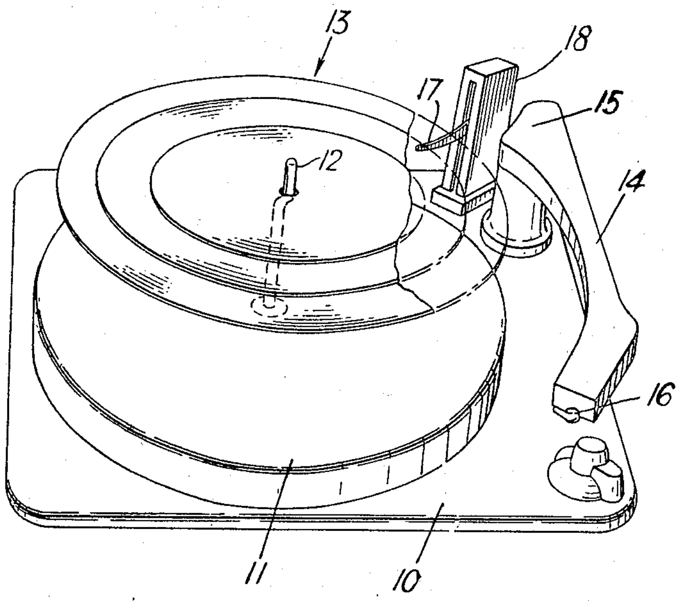
FIGURE 1 is a perspective view illustrating a record player to which the invention is applied.

With reference to the accompanying drawings, FIGURE 1 illustrates a record player to which the invention may be applied, only those parts being shown which are necessary for an understanding of the invention.

The apparatus comprises a base plate 10 which supports the driving motor (not shown) on its underside for rotating the turntable 11. A stationary spindle 12 extends upwardly through the center of the turntable and supports a stack of records 13 which are released, in known manner, one by one from the underneath of the stack to drop on to the turntable.

There is also the normal arrangement of pick-up arm 14 movable about a vertical axis at its end 15 to traverse across the turntable and also movable about a horizontal axis at this end so that it can be raised and lowered relative to the turntable. The pick-up arm carries a pick-up 16 at its outer end.

Figure 2:
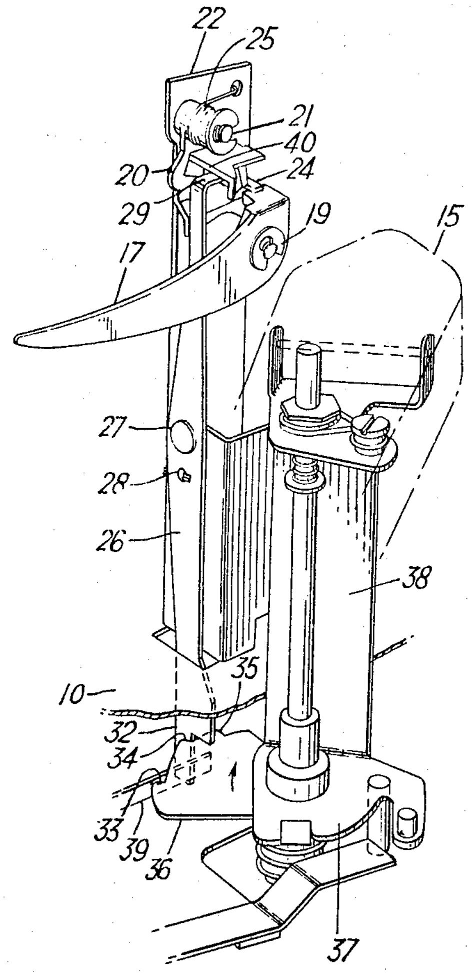
FIGURE 2 is a perspective view of the selector lever and associated parts.

The selector lever 17, of the present invention, projects from a hollow pillar 18 mounted on the base plate 10 and the pillar 18 houses the selector lever mechanism shown in FIGURE 2 and now described.

Figure 4:
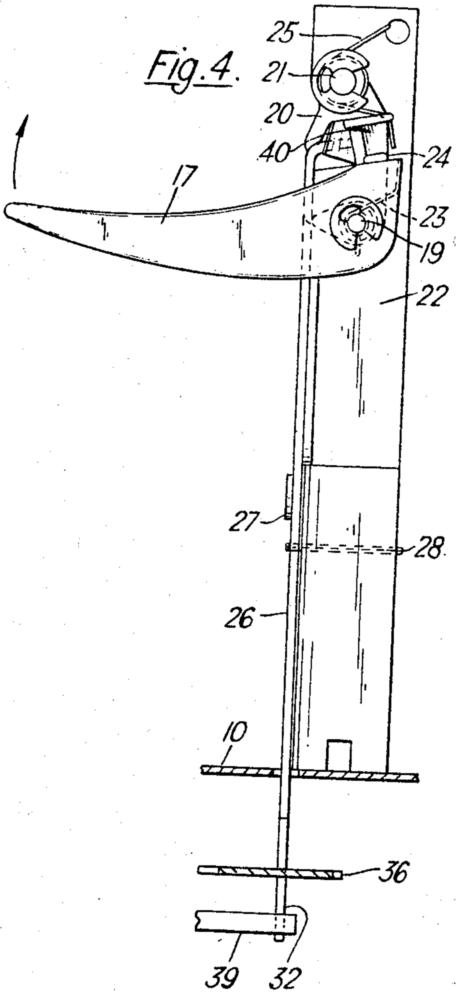
FIGURE 4 is a side view.

Referring to FIGURES 2–4, the selector lever 17, which moves in a vertical plane containing the axis of rotation of the turntable 11, is pivotally mounted about a horizontal axis on a spindle 19 carried by the lower end of a cranked lever 20, which is pivoted at its upper end about a horizontal axis upon a pin 21 fixed at the top of a rigid post 22 upstanding from the base plate 10 of the apparatus.

The selector lever 17 is biased by a spring 23, about its pivot on the cranked lever 20, against a stop 24 which is fixed to the cranked lever, in such a direction that the selector lever is allowed to swing upwards (in the direction of the arrow in FIGURE 4) when records are removed from the turntable spindle 12 but any downward movement of the selector lever 17 is communicated to the cranked lever, turns about the fixed pivot 21 on the rigid cranked lever, turns about the fiixed pivot 21 on the rigid post 22 (in anti-clockwise direction FIGURE 4).

The cranked lever 20 is biased about the fixed pivot, by a spring 25, against a vertical lever 26 which extends downwards below the base plate 10 and is pivoted at 27 to the rigid post 22 about the mid-point of its length, the axis of this pivot 27 being horizontal but at right angles to the two above mentioned pivotal axes 19 and 21, so that as this vertical lever 26 turns about its axis its upper end moves parallel to the spindle 19, which carries the selector lever. The vertical lever 26 is biased by a spring 28 so that its upper end is urged towards the cranked lever 20 (i.e. anti-clockwise in FIGURE 3).

The upper end of the said vertical lever 26 is bent over at right angles to itself in a direction radially outwards from the turntable spindle to form a finger 29. The arrangement is such that when the selector lever 17 is pushed down by a record, in its descent to the turntable, the spindle 19 on the cranked lever 20 swings away from the vertical lever 26 about the fixed pivotal axis 21 against the pressure provided by the spring 25.

The mechanism now provides three fixed positions for the vertical lever:

(a) When the selector lever 17 has been undisturbed, which is the case when a 7 inch diameter record slides down the turntable spindle, the vertical lever 26 rests with its upper end against the outer flat face 30 of the cranked part of the cranked lever 20 (see FIGURE 3).

Figure 5:
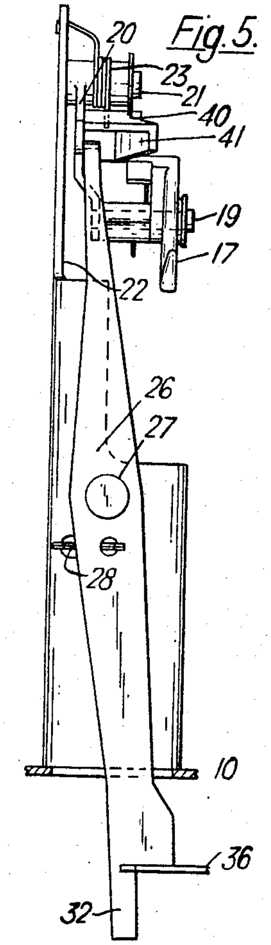

(b) When the selector lever 17 has been pushed down only a short way, by the passage of a 10 inch diameter record down the spindle to the turntable, the outer flat face 30 of the cranked part of the cranked lever is moved out of engagement with the upper end of the vertical lever 26 and the finger 29 formed on the upper end of the vertical lever moves into contact with the inner flat face 31 of the cranked lever under the influence of the spring 28 (see FIGURE 5).

Figure 6:
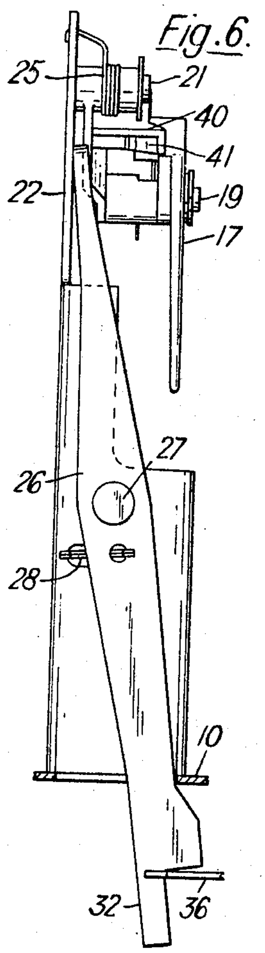

(c) When the selector lever is depressed by a 12 inch diameter record the cranked lever 20 swings right out of engagement with the vertical lever and its finger 29, allowing the upper end of the vertical lever to rest against the upstanding post 22, under pressure of spring 28 (see FIGURE 6).

The lower end 32 of the vertical lever arrests the pick-up arm as it progresses towards the centre of the turntable by engaging with one or other of three abutment surfaces 33, 34, 35, on a horizontal quadrant plate 36, which rotates with and is firmly clutched to the bottom flange 37 of the bracket 38 which supports the pick-up arm, during this phase of the operation of the apparatus. These abutment surfaces are displaced radially so that the position of the vertical lever 26 determines at what point in its movement the pick-up arm is arrested.

When a record has been played the pick-up arm is lifted from the record and returned to its rest position in the known way. Operating in association with this mechanism an arm 39 engaging the lower end of the vertical lever 26 moves the said vertical lever against its spring bias, away from the said abutment surfaces at its lower end and away from the rigid post 22 at its upper end until the selector lever 17 can return to position (a) (FIGURE 3) due to the pressure of spring 25 acting on the cranked lever 20.

Figure 7:
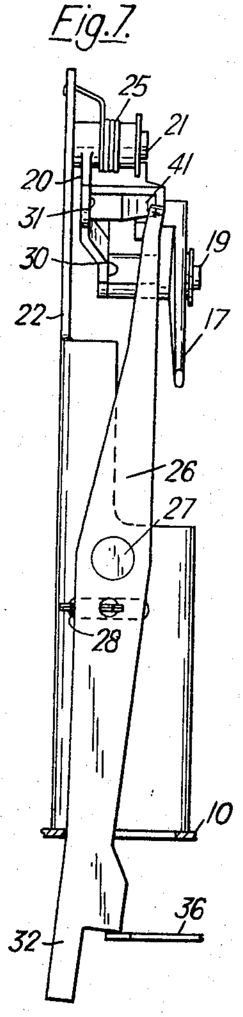

Mounted on or formed integrally with, the cranked lever 20 is a ramp 40 having an inclined face 41 which is engaged by the finger 29 on the vertical lever, said ramp being in such a position that when the said finger 29 is now moved further away from the rigid post 22 under the influence of the arm 39 engaging the lower end of the vertical lever 26 and said finger 29 rides up the inclined face 41 of the ramp, thus moving the cranked lever 20, against its spring bias, in the same direction as it is moved by the records on their downward path to the turntable, and thus lowering the selector lever 17 (see FIGURE 7).

With the presence of the said ramp 40 the lowest record of the stack may be lowered until it is just clear of the position occupied by the selector lever 17 when in position (a). This has not been possible hitherto, because, without the presence of the above mentioned ramp, when records are first loaded onto the spindle the slightest tilt of the records would cause the selector lever to be engaged and to be moved into position (b) or, alternatively, the selector lever may be flicked over the top of a ten inch record, causing faulty operation, and to avoid the possibility of faulty operation considerable clearance has hitherto had to be left between the selector lever in position (a) and the lowermost record of the stack.

With the ramp however, when the apparatus is stopped the selector lever has been lowered below the position it normally occupies for position (a) giving the clearance which is desired to avoid faulty operation being caused when the records are loaded on to the spindle.

When the cycle of operations is continued pressure of the arm 39 on the lower end of the vertical lever 26 is released and the finger 29 rides down the inclined face 41 of the ramp into position (a); then operation of the selector lever proceeds in the normal way.

It will be seen that with the present invention the height of the record carrying spindle 12 can be reduced as compared with the previous constructions, thus leading to an overall reduction in height of the apparatus, because it is not now necessary to provide the clearance previously necessary between the lowermost record of the stack and the selector lever in position (a).

What I claim then is:

1. In automatic record changing apparatus of the type specified, automatic means determining the position of arrest of the pick-up arm on its inward movement during a cycle of operations comprising, a post fixed to the base of the apparatus at the side of the turntable, a mounting for a selector lever carried by said post, a selector lever pivoted on said mounting, so as to be engaged by a record on its descent to the turntable, a vertical lever pivoted on said post, a quadrant plate rotatable with the pick-up arm during a cycle of operations, abutment faces on said quadrant plate engaged by the lower end of said vertical lever to arrest the inward movement of the pick-up arm, abutments on the selector lever mounting engaged by the upper end of the vertical lever, and means on the selector lever mounting engaged by the upper end of the vertical lever, said means causing depression of the selector lever when the vertical lever moves away from the abutments to its at-rest position at the end of a cycle of operations of the apparatus.

2. In automatic record changing apparatus of the type specified, automatic means determining the position of arrest of the pick-up arm on its inward movement during a cycle of operations comprising, a post fixed to the base of the apparatus at the side of the turntable, a mounting for a selector lever pivotally mounted upon said post about a horizontal axis, a selector lever pivoted on said mounting about a horizontal axis so as to be engaged by a record on its descent to the turntable, a vertical lever pivoted on said post, a quadrant plate rotatable with the pick-up arm during a cycle of operations, abutment faces on said quadrant plate engaged by the lower end of said vertical lever to arrest the inward movement of the pick-up arm, abutments on the selector lever mounting engaged by the upper end of the vertical lever, and means on the selector lever mounting engaged by the upper end of the vertical lever, said means causing depression of the selector lever when the vertical lever moves away from the abutments to its at-rest position at the end of a cycle of operations of the apparatus.

3. In automatic record changing apparatus of the type specified, automatic means determining the position of arrest of the pick-up arm on its inward movement during a cycle of operations comprising, a post fixed to the base of the apparatus at the side of the turntable, a cranked lever pivoted at one end about a horizontal axis upon said post, a selector lever pivoted on the other end of said cranked lever about a horizontal axis, so as to be engaged by a record on its descent to the turntable, a vertical lever pivoted on said post, a quadrant plate rotatable with the pick-up arm during a cycle of operations, abutment faces on said quadrant plate engaged by the lower end of said vertical lever to arrest the inward movement of the pick-up arm, abutments on said cranked lever engaged by the upper end of the vertical lever and means on the cranked lever engaged by the upper end of the vertical lever, said means causing depression of the selector lever when the vertical lever moves away from the abutments to its at-rest position at the end of a cycle of operations of the apparatus.

4. In automatic record changing apparatus of the type specified, automatic means determining the position of arrest of the pick-up arm on its inward movement during a cycle of operations comprising, a post fixed to the base of the apparatus at the side of the turntable, a cranked lever pivoted at one end about a horizontal axis upon said post, a selector lever pivoted on the other end of said cranked lever about a horizontal axis so as to be engaged by a record on its descent to the turntable, a vertical lever pivoted on said post, the upper end of said vertical lever having a laterally projecting finger, a quadrant plate rotatable with the pick-up arm during a cycle of operations, abutment faces on said quadrant plate engaged by the lower end of said vertical lever to arrest the inward movement of the pick-up arm, abutments on said cranked lever engaged by the upper end of the vertical lever and means on the cranked lever engaged by said finger on the vertical lever, said means causing depression of the selector lever when the vertical lever moves away from the abutments to its at-rest position at the end of a cycle of operations of the apparatus.

5. In automatic record changing apparatus of the type specified, automatic means determining the position of arrest of the pick-up arm on its inward movement during a cycle of operations comprising, a post fixed to the base of the apparatus at the side of the turntable, a cranked lever pivoted at one end about a horizontal axis upon said post, a selector lever pivoted on the other end of said cranked lever about a horizontal axis so as to be engaged by a record on its descent to the turntable, a vertical lever pivoted on said post about a horizontal axis mutually at right angles to said aforementioned horizontal axes, the upper end of said vertical lever having a laterally projecting finger, a quadrant plate rotatable with the pick-up arm during a cycle of operations, abutment faces on said quadrant plate engaged by the lower end of said vertical lever to arrest the inward movement of the pick-up arm, abutments on said cranked lever engaged by the upper end of the vertical lever and a ramp on said cranked lever having an inclined face engaged by said finger on the vertical lever, said ramp causing depression of the selector lever when the vertical lever moves away from the abutments to its at-rest position at the end of a cycle of operations of the apparatus.

6. In automatic record changing apparatus of the type specified, automatic means determining the position of arrest of the pick-up arm on its inward movement during a cycle of operations comprising, a post fixed to the base of the apparatus at the side of the turntable, a cranked lever pivoted at one end about a horizontal axis upon said post, a selector lever pivoted on the other end of said cranked lever about a horizontal axis, so as to be engaged by a record on its descent to tthe turntable, a vertical lever pivoted on said post about a horizontal axis mutually at right angles to said aforementioned horizontal axes, the upper end of said vertical lever having a laterally projecting finger, a quadrant plate rotatable with the pick-up arm during a cycle of operations, abutment faces on said quadrant plate engaged by the lower end of said vertical lever to arrest the inward movement of the pick-up arm, said cranked lever having two horizontally spaced parallel faces forming the cranked part and said post having a face parallel to said two faces and said three faces forming abutments engaged by the upper end of the vertical lever, and a ramp on said cranked lever having an inclined face engaged by said finger on the vertical lever, said ramp causing depression of the selector lever when the vertical lever moves away from the abutments to its at-rest position at the end of a cycle of operations of the apparatus.

References Cited by the Examiner

UNITED STATES PATENTS

| | | | |
|---|---|---|---|
| 2,823,039 | 2/1958 | Collaro et al. | 274—10 |
| 2,825,570 | 3/1958 | Guest | 274—10 |
| 2,950,921 | 8/1960 | Guest | 274—10 |

NORTON ANSHER, *Primary Examiner.*